United States Patent
Sano et al.

(10) Patent No.: US 11,364,452 B2
(45) Date of Patent: Jun. 21, 2022

(54) EXTRACTION DEVICE AND METHOD FOR SAME

(71) Applicant: Hitachi, Ltd., Tokyo (JP)

(72) Inventors: Tadashi Sano, Tokyo (JP); Toom Miyasaka, Tokyo (JP); Sachio Sekiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/754,153

(22) PCT Filed: Oct. 11, 2018

(86) PCT No.: PCT/JP2018/037868
§ 371 (c)(1),
(2) Date: Apr. 7, 2020

(87) PCT Pub. No.: WO2019/093057
PCT Pub. Date: May 16, 2019

(65) Prior Publication Data
US 2021/0077919 A1   Mar. 18, 2021

(30) Foreign Application Priority Data
Nov. 13, 2017 (JP) .............................. JP2017-217884

(51) Int. Cl.
*B01D 11/02* (2006.01)
*B01D 36/00* (2006.01)
*C11B 1/10* (2006.01)

(52) U.S. Cl.
CPC .......... *B01D 11/0292* (2013.01); *B01D 11/02* (2013.01); *B01D 11/028* (2013.01);
(Continued)

(58) Field of Classification Search
CPC ... B01D 11/02; B01D 11/028; B01D 11/0288; B01D 11/0292; B01D 11/0296;
(Continued)

(56) References Cited

U.S. PATENT DOCUMENTS

| 2002/0182722 A1* | 12/2002 | Corr ......................... | B01D 3/40 |
| | | | 435/309.1 |
| 2005/0210701 A1 | 9/2005 | Kanda et al. | |

(Continued)

FOREIGN PATENT DOCUMENTS

| CA | 2 897 553 C | 3/2016 |
| JP | 2007-237129 A | 9/2007 |

(Continued)

OTHER PUBLICATIONS

Japanese Office Action received in corresponding Japanese Application No. 2017-217884 dated Apr. 6, 2021.
(Continued)

*Primary Examiner* — Benjamin L Lebron
(74) *Attorney, Agent, or Firm* — Mattingly & Malur, PC

(57) ABSTRACT

Provided is an extraction method for extracting an extract from a mixture using liquefied gas that can dissolve the extract, the method facilitating extraction operations and enabling low cost operation. An extraction device that extracts a component dissolved in liquefied gas from material to be treated using continuous phase changes in the liquefied gas is characterized by being provided with: a compressor that feeds gas under pressure; a heat exchanger for generating liquefied gas by the gas flowing in a high temperature side flow path; a treatment tank into which the material to be treated is loaded and the liquefied gas flows; and a retention tank provided in series or in parallel to the flow path downstream of the high temperature side flow path in the heat exchanger.

11 Claims, 4 Drawing Sheets

(52) U.S. Cl.
CPC ...... *B01D 11/0219* (2013.01); *B01D 11/0288* (2013.01); *B01D 11/0296* (2013.01); *B01D 36/00* (2013.01); *C11B 1/10* (2013.01)

(58) Field of Classification Search
CPC ............ B01D 11/0488; B01D 11/0492; B01D 1/0047; B01D 1/02; B01D 3/007; B01D 5/006; F25B 1/00; C11B 1/10; C11B 1/104; C11B 1/108; C11B 7/0008; C11B 7/0016; C11B 7/0025; C11B 7/0058; C11B 9/025
See application file for complete search history.

(56) References Cited

U.S. PATENT DOCUMENTS

| | | | |
|---|---|---|---|
| 2007/0227493 | A1 | 10/2007 | Cheiky |
| 2009/0166175 | A1* | 7/2009 | Waibel ................ B01D 3/40 203/49 |
| 2016/0091226 | A1* | 3/2016 | Buese ................ B01D 11/0284 62/115 |
| 2016/0158763 | A1* | 6/2016 | Sano ................ C02F 11/12 62/62 |
| 2018/0001226 | A1 | 1/2018 | Sano et al. |
| 2018/0003438 | A1 | 1/2018 | Kokugan |
| 2018/0028935 | A1 | 2/2018 | Sano et al. |

FOREIGN PATENT DOCUMENTS

| | | |
|---|---|---|
| JP | 2009-532606 A | 9/2009 |
| JP | 2015-196827 A | 11/2015 |
| JP | 2016-064380 A | 4/2016 |
| WO | 2003/101579 A1 | 12/2003 |
| WO | 2015/033455 A1 | 3/2015 |
| WO | 2016/117100 A1 | 7/2016 |
| WO | 2016/120952 A1 | 8/2016 |
| WO | 2016/121012 A1 | 8/2016 |

OTHER PUBLICATIONS

International Search Report of PCT/JP2018/037868 dated Jan. 15, 2019.
Japanese Office Action received in corresponding Japanese Application No. 2017-217884 dated Oct. 26, 2021.

* cited by examiner ated carbon.
EXTRACTION DEVICE AND METHOD FOR SAME

TECHNICAL FIELD

The present invention relates to an extraction device for extracting an object from a mixture using a liquefied gas as a solvent.

BACKGROUND ART

As a background art in this technical field, there are PTL 1 and PTL 2.

PTL 1 discloses a configuration in which a mixture of a solid and a liquid is separated by using a cycle of a phase change of a substance A which is a gas at normal temperature and normal pressure and can dissolve water and oil in a liquefied state.

PTL 2 discloses an apparatus for regenerating a used activated carbon.

CITATION LIST

Patent Literature

PTL 1: WO 2003/101579
PTL 2: WO 2015/033455

SUMMARY OF INVENTION

Technical Problem

There are various liquefied gas that is a gas at normal temperature and normal pressure and can dissolve water and oil when liquefied. PTL 1 is disclosed as a solid-liquid separation technique utilizing the characteristics of the liquefied gas. In PTL 1, a method is disclosed in which DME (dimethyl ether) is selected as an example of a liquefied gas, and coal having a high water content, which is a mixture, is separated into water and coal. However, since there are two heat exchangers for supplying cold heat from the outside to circulate the DME, and a pressure recovery device is also installed, the device cost is high.

PTL 2 discloses a method for regenerating activated carbon by removing impurities from a used activated carbon to which impurities have been adsorbed using the DME. However, there is no description of a method for efficiently discharging the removed impurities out of the high-pressure system. Therefore, the present invention provides an extraction method for efficiently discharging an extract to the outside of a high-pressure system after completion of an extraction process.

Solution to Problem

In order to solve the above problems, the present invention provides an extraction device for extracting a component contained in an object to be treated. The extraction device includes a compressor that pumps an extractant, a first phase change unit that changes a phase of the extractant from gas to liquid, a second phase change unit that changes the phase of the extractant from liquid to gas, a treatment tank in which the object to be treated is stored, and into which the extractant liquefied in the first phase change section flows, a valve that is provided between the second phase change portion and the treatment tank, and a retention tank that is provided between the first phase change unit and the treatment tank.

Advantageous Effects of Invention

According to this invention, in an apparatus which extracts an object from a mixture using a cycle of a phase change of a liquefied gas, it is possible to provide an extraction method and an extraction device which take out an object efficiently.

DESCRIPTION OF EMBODIMENTS

Hereinafter, embodiments of the invention will be described with reference to the accompanying drawings.

First Embodiment

Figure 1:
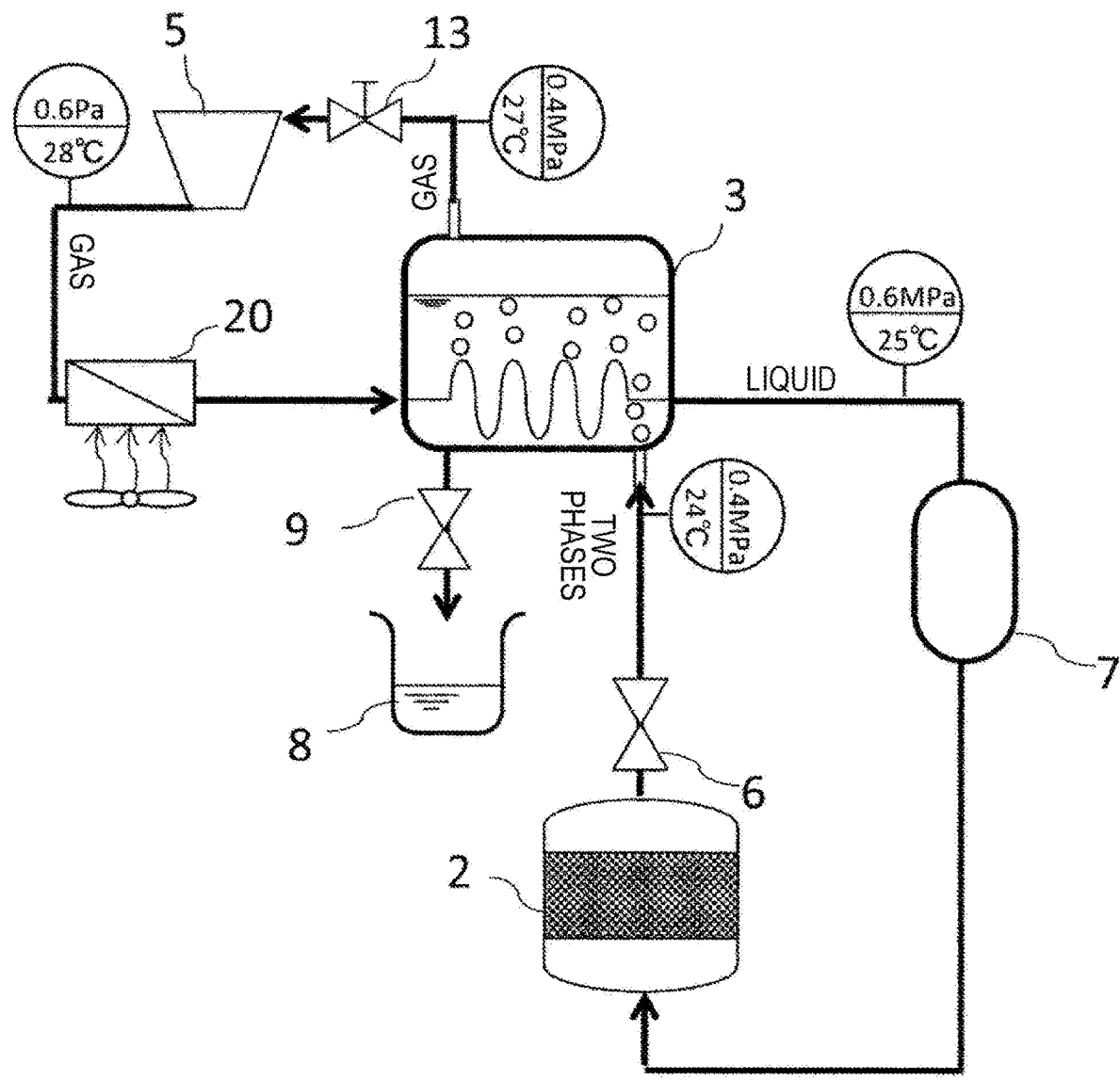
FIG. 1 is a schematic diagram illustrating a configuration of an extraction device according to a first embodiment.

Hereinafter, a first embodiment of the invention will be described using FIG. 1.

In this embodiment, an extraction device and an extraction method capable of efficiently extracting a component dissolved in a liquefied gas used as an extractant from an object to be treated will be described. Examples of the object to be treated include animals and plants, water-treated sludge, and the like, and examples of the dissolved component include water, oil, vitamins, minerals, amino acids, organic acids, and fatty acids.

Hereinafter, the extraction device and the extraction method of this embodiment will be described using fish as an object to be treated and fish oil as a dissolved component which is an extract, but the object to be treated and dissolved components of the present invention are not limited to fish and fish oil.

This embodiment is applicable to extraction of fish oil containing Docosa Hexaenoic Acid (DHA), Eicosa Pentaenoic Acid (EPA) and the like contained in fish.

An example of a configuration of the device for implementing the extraction method of an edible oil, which is one of the objects to which the present invention is applied, will be described using FIG. 1.

The extraction device of this embodiment includes a heat exchanger 3 for performing a phase change of the extractant, a compressor 5 for pumping the extractant, a treatment tank 2 in which fish to be treated is stored, an expansion valve 6 provided between the treatment tank 2 and the heat exchanger 3 and in a path through which the liquefied extractant passes, a retention tank 7 provided between the treatment tank 2 and the heat exchanger 3 and in a path through which the liquefied extractant passes, a closing valve 13 provided in a path through which the extractant vaporized in the heat exchanger 3 passes, and a collection valve 9 for collecting the extract extracted from the object to be treated into a collection container 8.

In this embodiment, butane is used as a liquefied gas capable of dissolving oil as an extractant. In addition, an example is described in which a shell-and-tube type of the heat exchanger 3 is used to allow a vaporized butane gas to pass through the tube side. As the compressor 5, various types such as a pump and a compressor may be applied. In this embodiment, butane itself as an extractant forms a refrigeration cycle of a heat exchanger. Therefore, the compressor 5 uses a gas-phase compressor, and it is necessary to provide the expansion valve 6 in the liquid-phase path to reduce the pressure and create a temperature difference. In this embodiment, the latent heat of vaporization necessary for the phase change of butane is supplied by its own latent heat of condensation. First, the butane gas is discharged as a high-temperature and high-pressure gas from the compressor 5 and sent to the tube of the heat exchanger 3 via the cooler 20.

In the heat exchanger 3, while the high-temperature butane gas is condensed, the heat of condensation is transferred to the liquefied butane on the shell side, so that the liquefied butane on the shell side uses supplied heat as evaporation heat to become butane gas. The liquefied butane that has been sent into the tube and has become a liquid is supplied to the treatment tank 2 through the retention tank 7.

In the treatment tank 2, filters are installed on the inlet side and the outlet side, and the fish is sealed between them. When the liquefied butane is supplied to the treatment tank 2, the liquefied butane and the fish are brought into efficient contact with each other by stirring as needed, and the fish oil in the fish is dissolved in the liquefied butane. At this time, if the flow direction of the liquefied butane in the treatment tank 2 is the upward flow, the filter is less likely to be clogged, so that there is an advantage that the pressure loss in the treatment tank 2 can be reduced.

The liquefied butane in which the fish oil is dissolved in the treatment tank 2 is sent to the expansion valve 6. The liquefied butane in which the fish oil has been dissolved is reduced in temperature and pressure when passing through the expansion valve 6, and the liquefied butane is sent to the shell side of the heat exchanger 3 as a two-phase flow. The temperature is reduced by passing through the expansion valve 6, and a temperature difference is generated between the shell side and the tube side, thereby enabling heat exchange.

In the heat exchanger 3, the liquefied butane on the shell side evaporates by receiving the heat of condensation of the butane gas on the tube side to become butane gas. At this time, since the boiling point of the fish oil is higher than that of butane, the fish oil remains without evaporating and is concentrated in the heat exchanger. The evaporated butane gas is sent to the compressor 5 again, so that a phase change cycle of butane is formed in the high-pressure system. In addition, in the steady operation, the fish oil stays in the heat exchanger 3, so that the temperature of the fish oil does not change, and the heat can be efficiently transferred from the latent heat of condensation to the latent heat of evaporation.

The cooler 20 is provided to exclude the heat generated by the friction loss of the compressor 5 from the phase change cycle of butane. The cooler 20 constantly measures the temperature so that the butane gas maintains the specified temperature. Depending on the result, the cooler 20 is operated, but it is not essential for practicing the present invention.

When the dissolution of the fish oil in the treatment tank 2 is completed, the fish oil to be collected is held in the heat exchanger 3 together with the liquefied butane. If the extract discharging operation for collecting the fish oil by opening the collection valve 9 in this state is performed, the liquefied butane is also discharged. Therefore, it is necessary to inject a large amount of butane again into the phase change cycle of butane.

In order to prevent this, the present invention performs the following collection operation.

First, the expansion valve 6 is fully closed, and the compressor 5 is operated. In this state, the liquefied butane on the shell side evaporates always, and the butane gas on the tube side continues to condense. The condensed liquefied butane is stored in the retention tank 7 installed downstream of the tube. The retention tank 7 needs a margin to allow liquefied butane to flow into during the collection operation of the fish oil. During the steady operation (during an extraction operation) in which the expansion valve 6 is not fully closed, it is preferable that most of the inside of the retention tank 7 be filled with butane gas, and that the amount of liquefied butane be smaller.

In addition, it is more preferable that the retention tank 7 be located below the heat exchanger 3 in the vertical direction. Due to the influence of gravity, the liquid easily flows into the retention tank 7 on the lower side, so that liquid butane in the tube can be easily removed, and the liquid can be prevented from remaining on the tube side of the heat exchanger 3. Since the latent heat of evaporation on the shell side can be suppressed from being used not only as latent heat of condensation on the tube side but also as sensible heat for cooling, the efficiency of phase change can be improved. For the same reason, it is preferable to dispose the treatment tank 2 below the heat exchanger 3 in the vertical direction.

When the compressor 5 is continuously driven with the expansion valve 6 closed, most of butane on the shell side of the heat exchanger 3 is removed, and the purity of fish oil is improved.

When the fish oil is taken out under atmospheric pressure, the pressure on the shell side of the heat exchanger 3 is kept at or above atmospheric pressure in order to prevent outside air from flowing into the high-pressure system. During the collection operation, the pressure on the shell side of the heat exchanger 3 is always measured, and the closing valve 13 is fully closed when the pressure approaches the atmospheric pressure, and the closing valve 13 is fully closed until the discharge. Here, when the timing of fully closing the closing valve 13 is delayed and the shell side becomes equal to or lower than the atmospheric pressure, the expansion valve 6 is temporarily opened to supply butane, and the pressure on the shell side is increased. In addition, in a case where the compressor 5 to be used is a displacement type, the role of the closing valve 13 can be replaced by stopping the operation of the compressor 5. After the adjustment of the shell side of the heat exchanger 3 to an appropriate pressure is completed, the fish oil can be collected in the collection container 8 by opening the collection valve 9.

In this embodiment, the amount of liquefied butane remaining on the shell side of the heat exchanger 3 can be reduced by performing the collection operation of closing the expansion valve 6 and driving the compressor 5 before discharging the extract. In addition, since the retention tank 7 capable of storing butane moving from the shell side to the tube side in the collection operation is provided, the collection operation can be efficiently performed.

Further, in this embodiment, a configuration is described in which the expansion valve 6 provided in the liquid phase path is used as a closing valve that is fully closed during the collection operation. However, a closing valve may be provided in addition to the expansion valve 6. In this embodiment, since the expansion valve 6 for forming the refrigeration cycle is used as the closing valve, there is a merit on that the number of parts can be reduced.

Further, in this embodiment, butane is exemplified as a gas to be used, but the same extraction can be performed with propane, normal butane, isobutane, neopentane, and isopentane. In addition, in a case where the extraction target is water or a water-soluble substance, it is preferable to use dimethyl ether or ethyl methyl ether that can dissolve the target.

In addition, if the compressor 5 is of a type requiring a lubricating material, the lubricating material may be mixed into fish oil. Therefore, it is preferable to use an oil-free compressor, for example, a diaphragm type or a tube pump type compressors. If a lubricant is used for the compressor 5, it is preferable to use harmless edible oil or silicone oil as the lubricant.

Second Embodiment

Figure 2:
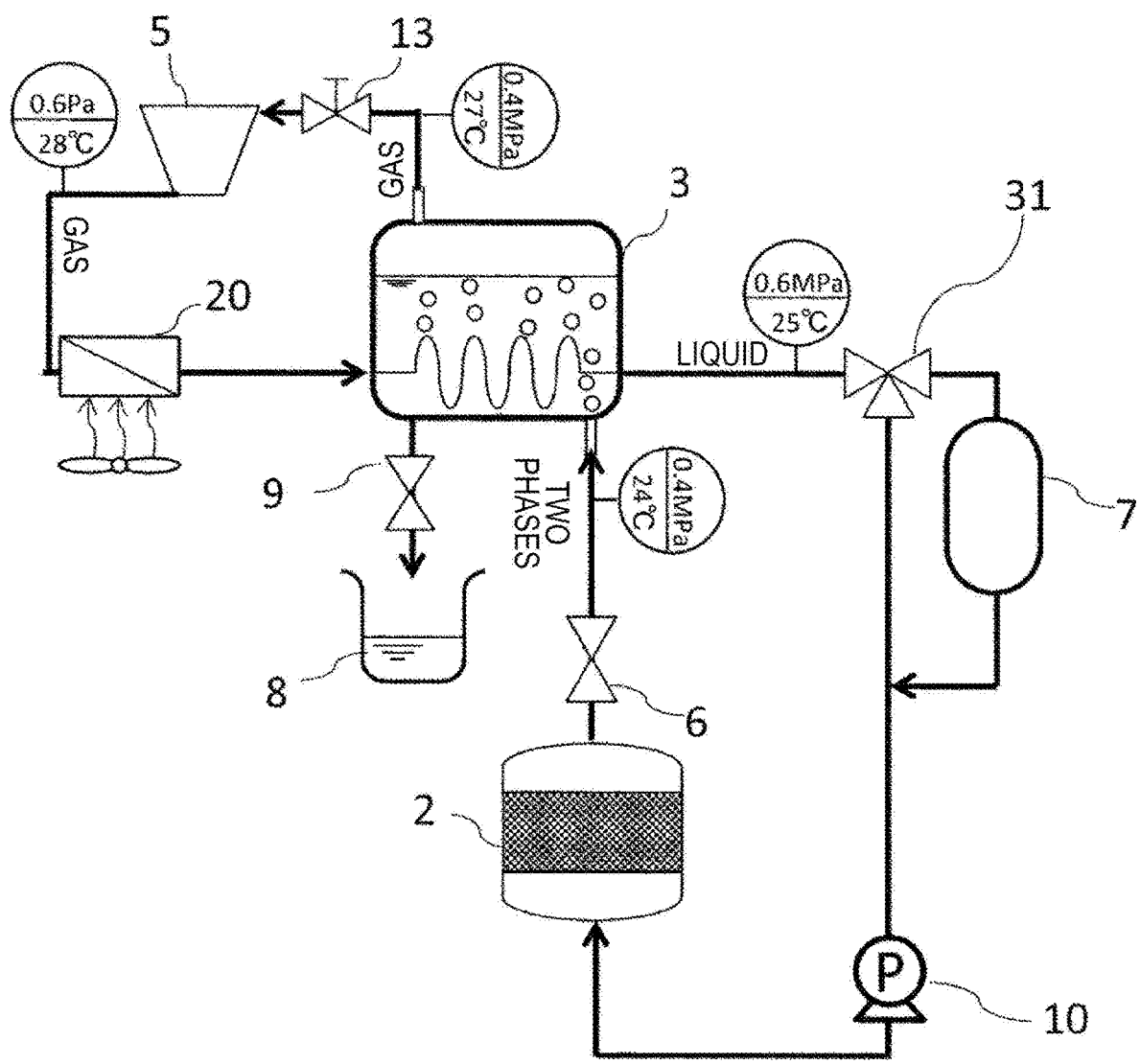
FIG. 2 is a schematic diagram illustrating a configuration of an extraction device according to a second embodiment.

A second embodiment of the present invention will be described using FIG. 2. Further, the description of the same configuration as that of the first embodiment is omitted. In this embodiment, the configuration from the downstream of the heat exchanger 3 on the tube side to the treatment tank 2 is different from that of the first embodiment.

In this embodiment, the retention tank 7 is similarly provided in the path through which the liquefied butane liquefied in the heat exchanger 3 flows, but the retention tanks 7 are provided in parallel unlike the first embodiment. Then, there is provided a switching valve 31 which causes the liquefied butane to flow without passing through the retention tank 7 during the steady operation (when the expansion valve 6 is opened), and switches the path to pass through the retention tank 7 during collection operation (when the expansion valve 6 is fully closed).

In the retention tank 7, a gas-liquid interface exists in a wider area than the pipe. Therefore, in a case where the liquefied gas to be used is a liquid that easily foams, and passes through the retention tank 7 during the steady operation, the inside is filled with bubbles. This makes it difficult to measure the position of the gas-liquid interface during the operation. In order to prevent such a situation, the liquefied butane flowing out from the tube side of the heat exchanger 3 is guided to the treatment tank 2 without passing through the retention tank 7 during the steady operation.

During the collection operation, the expansion valve 6 is fully closed, the switching valve 31 allows the heat exchanger 3 to communicate with the retention tank 7, and the liquefied butane is stored in the retention tank 7.

Although not an essential configuration in this embodiment, it is more preferable to provide a pump 10 in a path through which butane liquefied in the heat exchanger 3 flows. The pump 10 can increase the pressure at which the liquefied butane is sent, so that the liquefied gas can be stably sent to the treatment tank 2 even in a case where the pressure loss in the treatment tank 2 is large. The installation position of the pump 10 is preferably lower than the treatment tank 2, the heat exchanger 3, and the retention tank 7 in the vertical direction in order to prevent a decrease in the liquid sending efficiency due to gas suction. Even when the pump 10 is applied to the structure in which the retention tanks 7 are arranged in series as described in the first embodiment, the same effect can be obtained.

Third Embodiment

Figure 3:
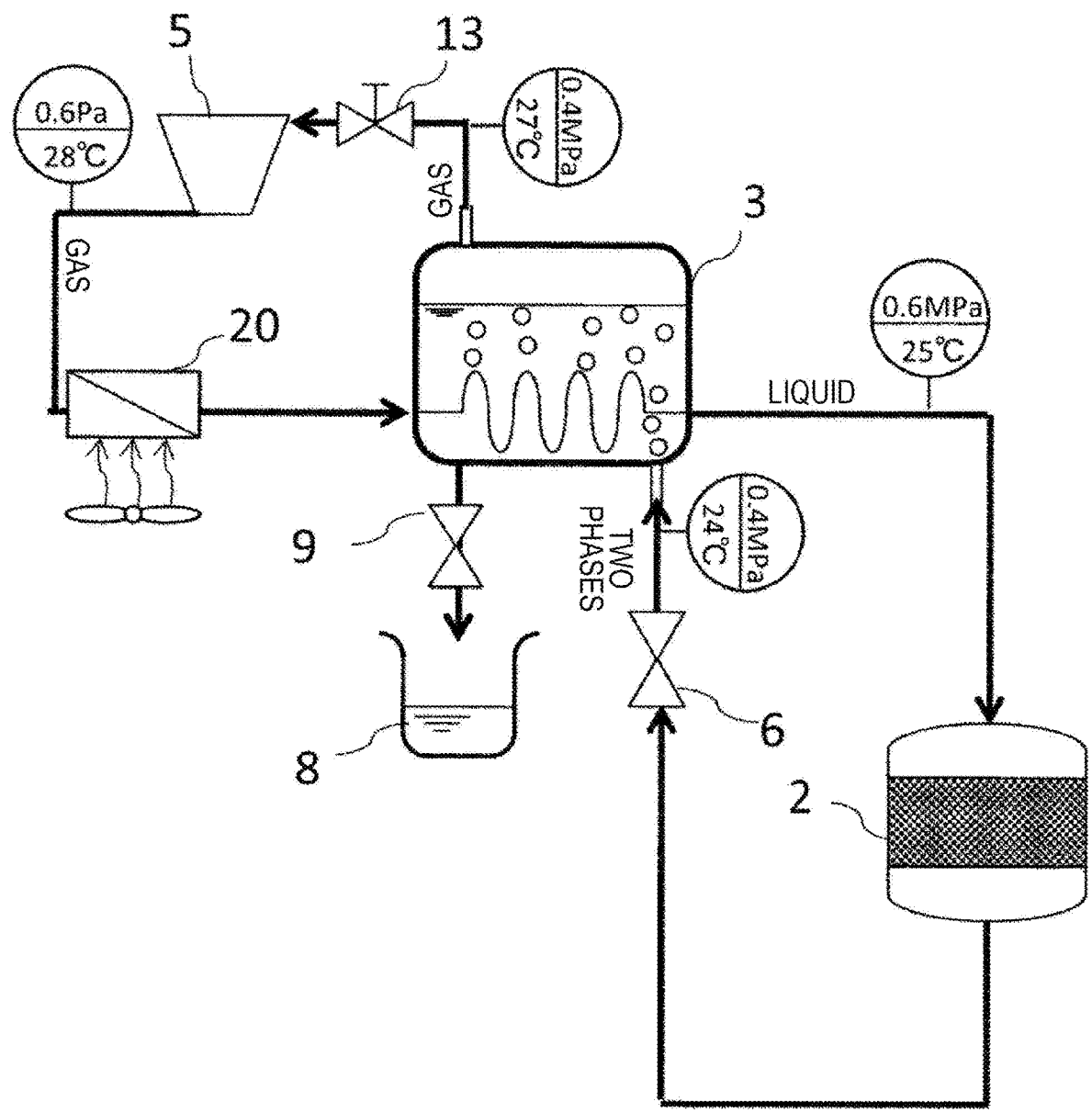
FIG. 3 is a schematic diagram illustrating a configuration of an extraction device according to a third embodiment.

Another example of a device configuration different from that of the first embodiment will be described using FIG. 3.

In this embodiment, the configuration from the downstream of the heat exchanger 3 on the tube side to the treatment tank 2 is different from that of the first embodiment.

The liquefied butane flowing out of the tube side of the heat exchanger 3 is directly guided to the upper side in the vertical direction of the treatment tank 2. The amount of gas sealed in the high-pressure system is adjusted so that a gas-liquid interface exists inside the treatment tank 2 during the steady operation, and the upper portion is filled with butane gas.

During the steady operation, the liquefied butane is dropped from the upper portion inside the treatment tank 2, comes into contact with the fish to be treated, which is held above the lower filter, and flows out from the lower outlet.

During the collection operation, the expansion valve 6 is fully closed, and the liquefied butane discharged from the heat exchanger 3 is stored in the treatment tank 2.

Fourth Embodiment

Figure 4:
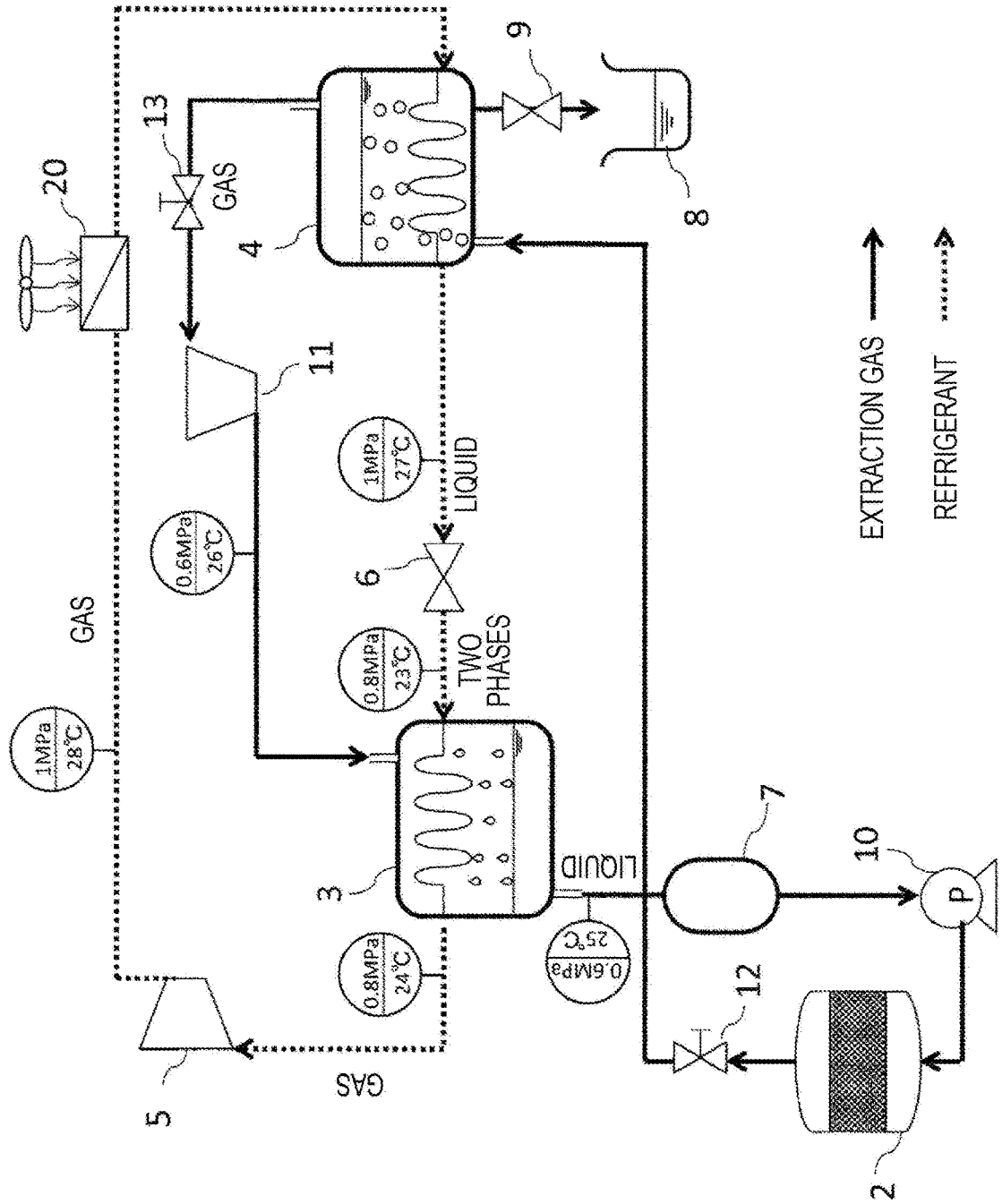
FIG. 4 is a schematic diagram illustrating a configuration of an extraction device according to a fourth embodiment.

A fourth embodiment of the present invention will be described using FIG. 4. Further, the description of the same configuration as that of the first embodiment is omitted.

In this embodiment, two kinds of gases are used: butane as a liquefied gas used for extraction, and chlorofluorocarbon as a refrigerant used for transferring heat. The gas for extraction used here need not be butane, and propane, normal butane, isobutane, neopentane, isopentane, dimethyl ether, and ethyl methyl ether may be selected according to the extraction target. The gas for heat transfer does not need to be Freon, and a gas that undergoes a phase change at an appropriate pressure near room temperature may be selected.

In this embodiment, the latent heat of vaporization and the latent heat of condensation necessary for the phase change of butane are transmitted by a refrigeration cycle using Freon. In addition, although the two heat exchangers are illustrated as a shell-and-tube type, the heat exchanger used for liquefying butane gas may be of a plate type to increase efficiency.

In the first embodiment, a first phase change unit that changes the phase of the extractant from gas to liquid and a second phase change unit that changes the phase of the extractant from liquid to gas are constructed by the heat exchanger 3. In this embodiment, the heat exchanger 3 is used for the first phase change unit, and a heat exchanger 4 is used for the second phase change unit, separately. The heat exchange in the heat exchangers 3 and 4 uses a refrigeration cycle of Freon.

First, Freon is discharged as a high-temperature and high-pressure gas from the compressor 5 and sent into the tube of the heat exchanger 4 via the cooler 20. Here, while the high-temperature Freon gas condenses, the heat of condensation is transferred to the butane side, so that the liquefied butane on the shell side uses the supplied heat as evaporation heat to become butane gas.

Next, the liquefied Freon which has become a liquid is sent to the expansion valve 6, where it is decompressed when passing through, the temperature and pressure are reduced, and the two-phase flow is sent to the tube side of the heat exchanger 3. Here, while the butane gas on the shell side condenses, the heat of condensation is transferred to the Freon side, so that the low-temperature liquefied Freon uses the supplied heat as the heat of evaporation to become Freon gas.

Next, the gaseous Freon gas is sent to the compressor 5 and compressed again to form a refrigeration cycle.

On the other hand, in the butane-side cycle, first, the liquefied butane discharged from the shell side of the heat exchanger 3 passes through the retention tank 7 and is sent by the pump 10 to the treatment tank 2 filled and held with fish. In the treatment tank 2, the fish oil contained in fish dissolves in the liquefied butane.

Next, the liquefied butane in which the fish oil has been dissolved passes through the filter inside the treatment tank, passes through a closing valve 12, and is sent to the heat exchanger 4. Since the Freon having a temperature slightly higher than the liquefied butane is continuously supplied to the heat exchanger 4, the liquefied butane is heated by the latent heat of the Freon, and is discharged as butane gas. In the case of providing two cycles, a cycle on the butane gas side and a cycle on the Freon gas side, it is not necessary to change the pressure in the cycle on the butane gas side, so a valve other than the expansion valve can be used. While the closing valve 12 is described, an expansion valve may be used. In a case where an expansion valve is used, the temperature difference between the Freon side and the butane side can be increased, so that the efficiency of the heat exchanger 4 is improved.

The merit of the closing valve 12 is that the pressure loss in the butane-side path can be reduced, so that a gas-phase compressor is not required. If butane can be circulated by gravity, the pump 10 also becomes unnecessary. On the other hand, when the pressure loss of the treatment tank is large, it is more preferable to circulate butane by providing the pump 10 as the liquid-phase compressor 11 in the liquid-phase path. At this time, since the fish oil dissolved in the liquefied butane has a boiling point or less, most of the fish oil remains in the heat exchanger 4 without being evaporated. The discharged high-purity butane gas is sent to the heat exchanger 3 by the compressor 11 via the closing valve 13.

Since the Freon having a temperature lower than that of butane gas is continuously supplied to the heat exchanger 3, the butane gas is cooled by the latent heat of vaporization of the Freon and discharged as the liquefied butane to form a phase change cycle of butane. The above is the steady operation.

In addition, there are two pumping machines, the compressor 11 and the pump 10, in the phase change cycle of butane. Using both pumps, there is a merit on that the treatment speed is improved. However, the effect of the present invention can be obtained even by using only one of the pumps. By arranging the heat exchanger 3, the treatment tank 2, and the heat exchanger 4 in the vertical direction of the equipment in order from the top, there is a merit on that the pressure feeding speed is improved.

When this steady operation is continued, the concentration of the fish oil on the shell side of the heat exchanger 4 increases. After a desired amount of fish oil has been obtained, the collection operation is performed.

In the collection operation, when the pump 10 is stopped, the closing valve 12 is fully closed, and the compressor 11 is operated, the pressure on the shell side of the heat exchanger 4 is reduced, so that the evaporation of the remaining liquefied butane is promoted. When the operation of the compressor 11 is continued, the pressure increases downstream of the compressor 11, so that the butane gas is liquefied. Since the liquefied butane is stored in the retention tank 7, the liquefied butane in the heat exchanger 4 is reduced, and the purity of the fish oil is improved. In the operation of taking out the fish oil under the atmospheric pressure, the closing valve 12, the closing valve 13, and the compressor 11 are appropriately controlled, and the pressure on the shell side of the heat exchanger 4 is maintained at or above the atmospheric pressure. After adjusting the shell side of the heat exchanger 4 to an appropriate pressure, the fish oil can be collected in the collection container 8 by opening the collection valve 9.

In addition, in the above-described method, the liquefied butane is removed from the heat exchanger 4 using the compressor 11 (a compressor for the gas phase or a compressor for the liquid phase) provided on the butane-side path. However, the liquefied butane can also be removed by operating the compressor 5 provided in the Freon-side path instead of the compressor 11. When the compressor 5 is operated with the closing valve 12 fully closed and the closing valve 13 opened, the liquefied butane remaining in the heat exchanger 4 is vaporized and becomes liquefied butane again in the heat exchanger 3. The liquefied butane is guided to and stored in the retention tank 7, and the purity of the fish oil in the heat exchanger 4 is improved.

It is preferable that the retention tank 7 be located below the heat exchanger 3 in the vertical direction in order to easily discharge the liquefied butane. In addition, the same effect can be achieved even when the retention tank 7 is provided in parallel with the flow path on the downstream side of the heat exchanger 3 as in the second embodiment.

Although the retention tank 7 described in each embodiment has a structure separate from the heat exchanger 3, the retention tank 7 may have a structure integrated below the heat exchanger 3.

REFERENCE SIGNS LIST 2 treatment tank
3 heat exchanger
4 heat exchanger
5 compressor
6 expansion valve
7 retention tank
8 collection container
9 collection valve
10 pump
12 closing valve
13 closing valve
20 cooler
31 switching valve

The invention claimed is:

1. An extraction device for extracting a component contained in an object to be treated, comprising:
   a first compressor;
   a first heat exchanger that changes a phase of the extractant from gas to liquid;
   a second heat exchanger that changes the phase of the extractant from liquid to gas;
   a closing valve disposed between the second heat exchanger and the first heat exchanger along a flow path;
   a second compressor disposed between the closing valve and the first heat exchanger along the flow path that pumps an extractant;
   a treatment tank in which the object to be treated is stored, and into which the extractant liquefied in the first heat exchanger flows;
   a valve that is provided between the second heat exchanger and the treatment tank; and
   a retention tank that is provided between the first heat exchanger and the treatment tank, wherein the gas from the second heat exchanger passes via the flow path to the first heat exchanger by the second compressor via the closing valve.

2. The extraction device according to claim 1, wherein the valve is closed to drive the first compressor before opening a collection valve for collecting an extract stored in the second heat exchanger.

3. The extraction device according to claim 1, wherein the valve is closed to drive the second compressor before opening a collection valve for collecting an extract stored in the second heat exchanger.

4. The extraction device according to claim 1, wherein the treatment tank is disposed in a vertical direction.

5. The extraction device according to claim 4, further comprising:
a filter disposed in an upper portion in the treatment tank, wherein a flow in the treatment tank is an upward flow during a steady operation of an extraction process.

6. The extraction device according to claim 5, wherein the retention tank is installed below the first heat exchanger in the vertical direction.

7. The extraction device according to claim 6, further comprising:
a pump which is downstream of the retention tank and upstream of the treatment tank.

8. The extraction device according to claim 7, wherein the pump is installed below the first heat exchanger in the vertical direction.

9. The extraction device according to claim 8, wherein the pump is installed below the retention tank in the vertical direction.

10. The extraction device according to claim 1, wherein as the first compressor, a compressor that uses edible oil or silicone oil as a lubricant, or an oil-free compressor is used.

11. The extraction device according to claim 1, wherein the extractant is any one of propane, normal butane, isobutane, neopentane, isopentane, dimethyl ether, and ethyl methyl ether, or a mixture of two or more thereof.

* * * * *